Figure 1:
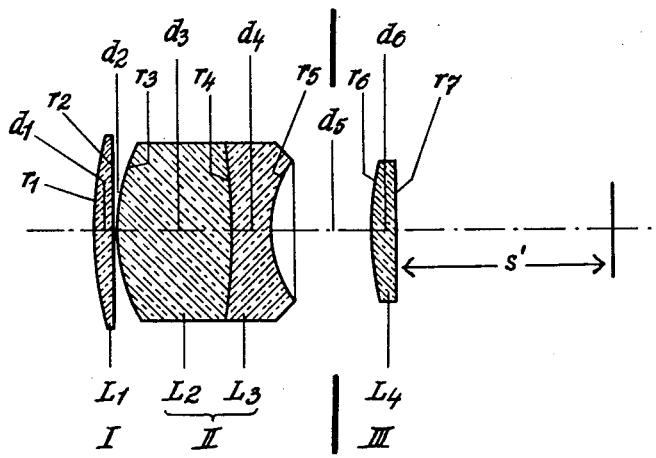

Feb. 21, 1961  R. SOLISCH  2,972,285
PHOTOGRAPHIC OR CINEMATOGRAPHIC HIGH-SPEED TELE-OBJECTIVE
Filed Nov. 13, 1958

INVENTOR:
Rudolf SOLISCH
BY
Agent

United States Patent Office 2,972,285
Patented Feb. 21, 1961

2,972,285

PHOTOGRAPHIC OR CINEMATOGRAPHIC HIGH-SPEED TELE-OBJECTIVE

Rudolf Solisch, Gottingen, Germany, assignor to Isco Optische Werke G.m.b.H., Gottingen-Weende, Germany, a corporation of Germany Filed Nov. 13, 1958, Ser. No. 773,607

Claims priority, application Germany Nov. 27, 1957

2 Claims. (Cl. 88—57)

My present invention relates to photographic or cinematographic objective of large focal length, i.e. to so-called tele-objectives, in which a multi-component lens group on the object side of a diaphragm space, i.e. on the side of the longer light rays, co-operates with a single lens component on the image side, or side of the shorter light rays.

In my co-pending application Ser. No. 770,439, filed October 29, 1958, now Patent No. 2,910,914, I have shown that it is possible to provide a tele-objective of this character having an aperture ratio of 1:2.8 or higher while utilizing five lenses, three of them combined into a dispersive triplet, of which all except the last two are made of a glass whose refractive index for the yellow $n_d$ line of the spectrum is less than 1.60. An objective as described in my co-pending application compares favorably with more conventional optical systems of similar structure in which, for the attainment of a like aperture ratio, it was necessary to use more highly refractive and therefore relatively expensive glasses throughout.

The object of my instant invention is to realize a similar advantage in a tele-objective in which the number of lenses is reduced to four.

I have found, in accordance with this invention, that the teachings of my above-identified application are also applicable to an optical system in which the first two constituents of the aforementioned triplet are combined into a single biconvex lens. This biconvex lens, along with the collective singlet preceding it, is made in accordance with the present invention of a glass whose refractive index is less than 1.60.

I have also found, in accordance with a further feature of my invention, that the rear (image-side) surface of the biconvex lens may be either cemented onto the immediately following, dispersive third lens of the front group or may be separated therefrom by a small air space, the latter variant being optically equivalent to the former if the closely spaced, substantially concentric surfaces of these two lenses are treated in well-known manner to minimize reflexes at the glass/air interfaces. In either case it is desirable that the refractive index of the preferably biconcave third lens exceed that of the biconvex second lens by a value ranging between substantially 0.12 and 0.18.

In accordance with still another feature of my invention, the sum total of the refractive indices $n_d$ of all four lenses should be less than 6.80 while the sum total of their Abbé numbers $\nu$ should be below 175.0. Such a system, aside from being inexpensive to produce, affords a substantial elimination of particularly comatic aberrations and a satisfactory flattening of the field which, with a high-speed objective of aperture ratio 1:2.8, will have an extent of $\pm14°$.

Figure 2:
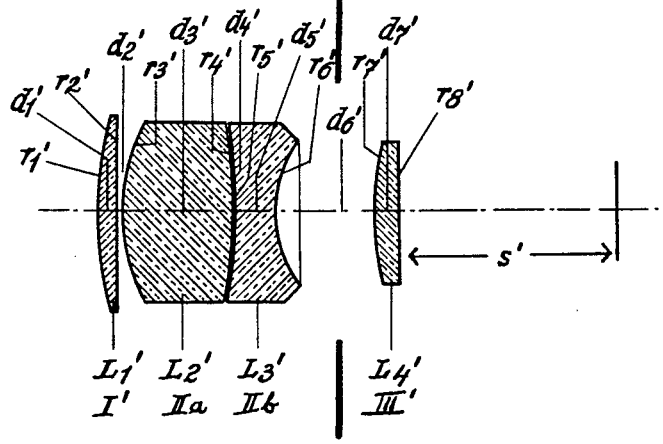

The invention will be described in greater detail with reference to the accompanying drawing in which Figs. 1 and 2 illustrate different embodiments corresponding to the two variants referred to above.

The tele-objective shown in Fig. 1 comprises a front group, consisting of a collective singlet I and a dispersive doublet II, and a single rear component III. Singlet I is a meniscus-shaped, almost plano-convex positive lens $L_1$ having radii of curvature $r_1$, $r_2$ and thickness $d_1$; it is separated by an air space $d_2$ from the doublet II consisting of lens elements $L_2$ and $L_3$ cemented together. Lens element $L_2$, having radii $r_3$, $r_4$ and thickness $d_3$, is of biconvex configuration. Lens element $L_3$ (radii $r_4$, $r_5$, and thickness $d_4$) is biconcave and represents the only part of the front group which has an index of refraction greater than 1.60. Rear component III, separated from doublet II by a diaphragm space $d_5$, is shown as a single plano-convex lens $L_4$ having radii $r_6$, $r_7$ and thickness $d_6$; similarly to lens element $L_3$, the singlet $L_4$ also consists of a glass of relatively elevated index of refractivity exceeding 1.60.

The system shown in Fig. 1 may be designed for a relative aperture of 1:2.8 and a back-focal length of $s'=42.8$, based upon an overall focal length of numerical value 100. Representative numerical values for the parameters $r_1$ to $r_7$ and $d_1$ to $d_6$ of lenses $L_1$ to $L_4$, together with the refractive indices $n_d$ and the Abbé numbers $\nu$ thereof, are as follows:

Table A

| Lens | | Radii | Thicknesses and Air Spacings | $n_d$ | $\nu$ |
|---|---|---|---|---|---|
| I | $L_1$ | $r_1=+72.61$ | $d_1= 3.95$ | 1.58913 | 61.2 |
| | | $r_2=+459.05$ | $d_2= 0.60$ | air space | |
| II | $L_2$ | $r_3=+35.95$ | $d_3=22.45$ | 1.58900 | 48.6 |
| | | $r_4=-118.95$ | $d_4= 8.65$ | 1.74077 | 27.7 |
| | $L_3$ | $r_5=+23.20$ | $d_5=19.25$ | diaphragm space | |
| III | $L_4$ | $r_6=+57.10$ | $d_6= 4.30$ | 1.67270 | 32.2 |
| | | $r_7=\infty$ | | | |
| | | | $d_{total}=59.20$ | $n_{total}=6.59160$ | $\nu_{total}=169.7$ |

Fig. 2 shows a modified system according to the invention, consisting of four air-spaced lenses $L_1'$, $L_2'$, $L_3'$ and $L_4'$, all of substantially the same configuration and refractive index as their counterparts in Fig. 1. Singlet I', consisting of front lens $L_1'$, has radii $r_1'$, $r_2'$ and thickness $d_1'$ and is nearly identical with singlet I in the preceding embodiment. The doublet II of that embodiment has been split into singlets IIa, IIb respectively consisting of the lens elements $L_2'$ (radii $r_3'$, $r_4'$ and thickness $d_3'$) and $L_3'$ (radii $r_5'$, $r_6'$ and thickness $d_5'$). The two almost concentric adjoining surfaces $r_4'$, $r_5'$ of these lenses, which turn their concavities toward the object side of the system, are separated from each other by a gap $d_4'$ which is a fraction of the air space $d_2'$ between lenses $L_1'$ and $L_2'$. Rear component III', positioned beyond the diaphragm space $d_6'$, is represented by lens $L_4'$ having radii $r_7'$, $r_8'$ and thickness $d_7'$.

Listed below are representative numerical values for the parameters $r_1'$ to $r_8'$ and $d_1'$ to $d_7'$ of the lenses $L_1'$ to $L_4'$ of Fig. 2, again based upon an overall focal length of numerical value 100, in a system having a relative aperture of 1:2.8 and a back-focal length of $s'=42.2$.

Table B

| Lens | | Radii | Thicknesses and air Spacings | $n_d$ | $\nu$ |
|---|---|---|---|---|---|
| I' | $L_1'$ | $r_1'=+\ 72.91$ | $d_1'=\ 3.95$ | 1.58913 | 61.2 |
|  |  | $r_2'=+460.91$ | $d_2'=\ 0.60$ | air space |  |
| IIa | $L_2'$ | $r_3'=+\ 36.09$ | $d_3'=22.40$ | 1.58900 | 48.6 |
|  |  | $r_4'=-\ 95.21$ | $d_4'=\ 0.15$ | air space |  |
| IIb | $L_3'$ | $r_5'=-\ 94.40$ | $d_5'=\ 8.70$ | 1.72825 | 28.3 |
|  |  | $r_6'=+\ 23.11$ | $d_6'=19.35$ | diaphragm space |  |
| III' | $L_4'$ | $r_7'=+\ 57.34$ | $d_7'=\ 4.30$ | 1.67270 | 32.2 |
|  |  | $r_8'=\infty$ |  |  |  |
|  |  |  | $d_{total}=59.45$ | $n_{total}=6.57908$ | $\nu_{total}=170.3$ |

It will be seen that in both embodiments the refractivity of the rear element $L_3$ or $L_3'$ of the dispersive pair of the front group exceeds that of its mate $L_2$ or $L_2'$ by a value ranging between the aforestated limits of 0.12 and 0.18, this value being approximately 0.15 in the case of Table A and 0.14 in the case of Table B. The sum totals of the refractive indices $n_d$ and of the Abbé numbers $\nu$ lie in each case well below the limiting values of 6.80 and 175.0, respectively.

I claim:

1. An optical tele-objective system consisting of three front lenses and a single rear lens, said front lenses consisting of a collective singlet followed by a dispersive lens pair composed of a biconvex forward element and a biconcave rear element, said singlet and said forward element having each an index of refraction less than 1.60, said forward element and said rear element being cemented together, the numerical values of the radii of curvature $r_1$ to $r_7$ of said singlet $L_1$, said forward element $L_2$, said rear element $L_3$ and said rear component $L_4$, as well as the thicknesses and air spacings $d_1$ to $d_6$ thereof, based upon a numerical value of 100 for the overall focal length of the system, the refractive indices $n_d$ of the elements $L_1$ to $L_4$ and the Abbé numbers $\nu$ thereof being substantially as given in the following table:

| Lens | Radii | Thicknesses and Air Spacings | $n_d$ | $\nu$ |
|---|---|---|---|---|
| $L_1$ | $r_1=+\ 72.61$ | $d_1=\ 3.95$ | 1.58913 | 61.2 |
|  | $r_2=+459.05$ | $d_2=\ 0.60$ | air space |  |
| $L_2$ | $r_3=+\ 35.95$ | $d_3=22.45$ | 1.58900 | 48.6 |
| $L_3$ | $r_4=-118.95$ | $d_4=\ 8.65$ | 1.74077 | 27.7 |
|  | $r_5=+\ 23.20$ | $d_5=19.25$ | diaphragm space |  |
| $L_4$ | $r_6=+\ 57.10$ | $d_6=\ 4.30$ | 1.67270 | 32.2 |
|  | $r_7=\infty$ |  |  |  |

2. A tele-objective system consisting of three front lenses and a single rear lens, said front lenses consisting of a collective singlet followed by a dispersive lens pair composed of a biconvex forward element and a biconcave rear element, said singlet and said forward element having each an index of refraction less than 1.60 wherein the numerical values of the radii of curvature $r_1'$ to $r_8'$ of said singlet $L_1'$, said forward element $L_2'$, said rear element $L_3'$ and said rear component $L_4'$, as well as the thicknesses and air spacings $d_1'$ to $d_7'$ thereof, based upon a numerical value of 100 for the overall focal length of the system, the refractive indices $n_d$ of the elements $L_1'$ to $L_4'$ and the Abbé numbers $\nu$ thereof are substantially as given in the following table:

| Lens | Radii | Thicknesses and air Spacings | $n_d$ | $\nu$ |
|---|---|---|---|---|
| $L_1'$ | $r_1'=+72.91$ | $d_1'=3.95$ | 1.58913 | 61.2 |
|  | $r_2'=+460.91$ | $d_2'=0.60$ | air space |  |
| $L_2'$ | $r_3'=+36.09$ | $d_3'=22.40$ | 1.58900 | 48.6 |
|  | $r_4'=-95.21$ | $d_4'=0.15$ | air space |  |
| $L_3'$ | $r_5'=-94.40$ | $d_5'=8.70$ | 1.72825 | 28.3 |
|  | $r_6'=+23.11$ | $d_6'=19.35$ | diaphragm space |  |
| $L_4'$ | $r_7'=+57.34$ | $d_7'=4.30$ | 1.67270 | 32.2 |
|  | $r_8'=\infty$ |  |  |  |

References Cited in the file of this patent

UNITED STATES PATENTS

| 1,360,667 | Minor | Nov. 30, 1920 |
| 2,186,622 | Bertele | Jan. 9, 1940 |
| 2,562,012 | Bertele | July 24, 1951 |
| 2,721,501 | Bertele | Oct. 25, 1955 |
| 2,750,839 | Schade | June 19, 1956 |
| 2,780,138 | Eismann et al. | Feb. 5, 1957 |

FOREIGN PATENTS

| 350,323 | Great Britain | June 11, 1931 |